(12) United States Patent
Park

(10) Patent No.: US 10,381,879 B2
(45) Date of Patent: Aug. 13, 2019

(54) WIRELESS POWER TRANSMISSION SYSTEM AND DRIVING METHOD THEREFOR

(71) Applicant: LG INNOTEK CO., LTD., Seoul (KR)

(72) Inventor: Jae Hee Park, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 33 days.

(21) Appl. No.: 15/743,207

(22) PCT Filed: Jul. 11, 2016

(86) PCT No.: PCT/KR2016/007048
§ 371 (c)(1),
(2) Date: Jan. 9, 2018

(87) PCT Pub. No.: WO2017/034143
PCT Pub. Date: Mar. 2, 2017

(65) Prior Publication Data
US 2018/0358841 A1 Dec. 13, 2018

(30) Foreign Application Priority Data

Aug. 24, 2015 (KR) .................. 10-2015-0118854

(51) Int. Cl.
*H02J 7/00* (2006.01)
*H02J 50/12* (2016.01)
*H02J 7/02* (2016.01)
*H02J 50/80* (2016.01)
*H02J 50/50* (2016.01)

(52) U.S. Cl.
CPC ................ *H02J 50/12* (2016.02); *H02J 7/02* (2013.01); *H02J 7/025* (2013.01); *H02J 50/80* (2016.02); *H02J 50/50* (2016.02)

(58) Field of Classification Search
CPC ........................................................ H02J 7/025
USPC .......................................................... 320/108
See application file for complete search history.

(56) References Cited

U.S. PATENT DOCUMENTS

| 9,672,975 | B2 * | 6/2017 | Keeling | ................... B60L 53/36 |
| 9,859,755 | B2 * | 1/2018 | Beaver | ..................... H02J 5/005 |
| 2011/0248572 | A1 * | 10/2011 | Kozakai | .................. H03F 1/565 |
| | | | | 307/104 |
| 2012/0205988 | A1 | 8/2012 | Tanabe | |
| 2012/0244822 | A1 | 9/2012 | Kim et al. | |

(Continued)

FOREIGN PATENT DOCUMENTS

JP 2012-55109 A 3/2012
JP 2014-217081 A 11/2014
(Continued)

*Primary Examiner* — Yalkew Fantu
(74) *Attorney, Agent, or Firm* — Birch, Stewart, Kolasch & Birch, LLP

(57) ABSTRACT

A transfer device comprising: a transfer coil; a power converter for providing transmission power to the transfer coil; and a controller for receiving, from a reception device, allowable reception power information and a control error value so as to control the power converter, wherein the controller determines new transmission power on the basis of the control error value and determines whether to output the new transmission power on the basis of the allowable reception power.

25 Claims, 8 Drawing Sheets

(56) References Cited

U.S. PATENT DOCUMENTS

| | | | |
|---|---|---|---|
| 2013/0147280 A1 | 6/2013 | Oettinger | |
| 2014/0184150 A1* | 7/2014 | Walley | H02J 5/005 320/108 |
| 2014/0306547 A1 | 10/2014 | Yanagawa | |
| 2014/0333144 A1 | 11/2014 | Ikeuchi et al. | |
| 2015/0078461 A1* | 3/2015 | Lee | H04B 5/0031 375/256 |

FOREIGN PATENT DOCUMENTS

| | | |
|---|---|---|
| JP | 2014-220893 A | 11/2014 |
| JP | 2015-502131 A | 1/2015 |
| JP | 5713714 B2 | 1/2015 |
| KR | 10-2012-0108153 A | 10/2012 |
| KR | 10-2014-0007273 A | 1/2014 |
| WO | WO 2014/001983 A1 | 1/2014 |
| WO | WO 2015/044943 A1 | 4/2015 |

\* cited by examiner

WIRELESS POWER TRANSMISSION SYSTEM AND DRIVING METHOD THEREFOR

CROSS REFERENCE TO RELATED APPLICATIONS

This application is the National Phase of PCT International Application No. PCT/KR2016/007048, filed on Jul. 11, 2016, which claims priority under 35 U.S.C. 119(a) to Patent Application No. 10-2015-0118854, filed in the Republic of Korea on Aug. 24, 2015, all of which are hereby expressly incorporated by reference into the present application.

TECHNICAL FIELD

Embodiments relate to a wireless power transfer system and a method of driving the same.

BACKGROUND ART

In general, various types of electronic apparatuses include respective batteries and are driven using power stored in the batteries. In an electronic apparatus, a battery may be replaced or recharged. To this end, the electronic device includes a contact terminal for contact with an external charging device. That is, the electronic apparatus is electrically connected to a charging device through a contact terminal. However, the contract terminal of the electronic apparatus is externally exposed and thus may be contaminated by foreign materials or short-circuited by moisture. In this case, contact failure occurs between the contact terminal and the charging device and thus the battery of the electronic apparatus is not charged.

In order to solve the above-described problem, wireless power transfer (WPT) for wirelessly charging the electronic apparatus is proposed. A WPT system transfers power over the air without a wire, thereby maximizing convenience of supply of power to a mobile apparatuses and digital appliances.

A WPT system has advantages such as energy conservation through real-time power use control, overcoming of power supply space restriction, and reduction in number of used batteries through battery recharging.

Representative examples of a method of implementing a WPT system include a magnetic induction method and a magnetic resonance method. The magnetic induction method uses a non-contact energy transmission technology for providing two coils close to each other and generating electromotive force in the other coil by magnetic flux generated when current flows in one coil, and may use a frequency of several hundred kHz. The magnetic resonance method uses a magnetic resonance technology of using only an electric field or a magnetic field without an electromagnetic wave or current, has a power transfer distance of more than several of meters, and may use a band of several MHz.

A WPT system includes a transfer device for wirelessly transferring power and a reception device for receiving power and charging a load such as a battery. At this time, a transfer device capable of selecting the charging method of the reception device, that is, any one of the magnetic induction method and the magnetic resonance method, and wirelessly transferring power in correspondence with the charging method of the reception device has been developed.

Meanwhile, as the reception device provided in the charging region of the transfer device is intentionally shaken or is frequently shaken as in a vehicle, a coupling coefficient is rapidly changed due to misalignment between the transmission and reception devices and thus power transferred from the transfer device is rapidly changed, thereby damaging the reception device.

DISCLOSURE

Technical Problem

Embodiments provide a wireless power transfer system capable of solving power transmission instability occurring by rapid change in coupling coefficient between transmission and reception devices as the reception device is shaken while wirelessly charging the reception device, and a method of driving the same.

Technical Solution

In accordance with one embodiment, a method of wirelessly transferring power from a transmitter to a receiver includes transferring a signal for detecting the receiver, receiving an identification signal from the receiver, transferring first power to the receiver, receiving a power increasing request signal from the receiver, determining second transfer coil current based on first transfer coil current of the transmitter and the power increasing request signal, determining second power based on the second transfer coil current, and comparing the second power, receivable power of the receiver and a power threshold with each other to determine whether the second power is transferred.

The determining of whether the second power is transferred may include determining whether the second power is transferred according to a difference between the receivable power and the second power.

The determining of whether the second power is transferred may include determining whether the second power is transferred according to a difference between the receivable power and an overshoot peak value of the second power.

If the difference exceeds the power threshold, wireless power transfer may end.

The method may further include transferring a signal for detecting the receiver when wireless power transfer ends.

The method may further include transferring predetermined wireless power when the receiver is detected.

The method may further include controlling a power converter based on proportional integral differential (PID) control, when the difference is equal to or less than the power threshold.

The controlling of the power converter based on PID control may include determining a control value based on the PID control, determining a current controlled variable based on the control value and a preceding controlled variable, and controlling the power converter based on the current controlled variable to transfer the second power.

The overshoot peak value may be determined based on at least one of the second power and an increment from the first power to the second power.

At least one of an input voltage, a drive frequency and a duty cycle of the power converter may be adjusted based on the controlled variable.

In accordance with another embodiment, a method of, at a receiver, wirelessly receiving power from a transmitter includes transferring a response signal to a first ping signal from the transmitter, transferring identification information to the transmitter, receiving first power from the transmitter, transferring a power increasing request signal to the transmitter, determining whether power is received from the transmitter, and transferring a response signal to a second ping signal from the transmitter when wireless power reception ends.

The method may further include receiving predetermined power from the transmitter, which has received the response signal.

The identification signal may include a receivable power of the receiver.

The method may further include comparing second power with desired power upon receiving the second power corresponding to the power increasing request signal and transferring a control error value to the transmitter according to a result of comparison. The control error value may be any one of a positive value, zero and a negative value, the power increasing request signal may correspond to a control error value of a positive value, a power maintenance request signal may correspond to a control error value of zero, and a power decreasing request signal may correspond to a control error value of a negative value.

In accordance with another embodiment, a transmitter includes a transfer coil configured to wirelessly transfer power, a power converter configured to output power to the transfer coil, and a controller configured to control the power converter in order to control the amount of power output to the transfer coil. The controller determines new power based on a power increasing request signal from a receiver and determines whether the new power is generated based on the new power, receivable power from the receiver and a power threshold.

Whether the new power is generated may be determined according to a difference between the receivable power and the new power.

Whether the new power is generated may be determined according to a difference between the receivable power and an overshoot peak value of the new power.

The overshoot peak value may be set based on at least one of the new power and an increment from current output power of the power converter to the new power.

Generation of the new power may end when the difference exceeds the power threshold.

The controller may adjust any one of a drive frequency, an input voltage or a duty cycle of the power converter to control an amount of power.

The controller may include a first calculator configured to determine second current based on the power increasing request signal from the receiver and first current of the transfer coil, a proportional integral differential (PID) controller configured to determine a control value based on PID control, and a second calculator configured to determine a current controlled variable based on the control value and a preceding controlled variable, and the power converter may be controlled based on the current controlled variable.

In accordance with another embodiment, a receiver includes a reception coil configured to receive first power from a transmitter and a controller configured to communicate with the transmitter. The controller transfers a power increasing request signal based on a difference between first power and desired power, and receives second power or a receiver ping signal based on the power increasing request signal.

The controller may determine the difference between the second power and the desired power when the reception coil receives the second power.

The controller may transfer a response signal to the ping signal.

Predetermined power may be received from the transmitter, which has received the response signal.

Advantageous Effect

According to embodiments, it is possible to prevent power transmission instability from occurring by rapid change in coupling coefficient between transmission and reception devices as the reception device is shaken while wirelessly charging the reception device and to prevent the reception device from being heated and damaged.

BEST MODE

Mode for Invention

Figure 1:
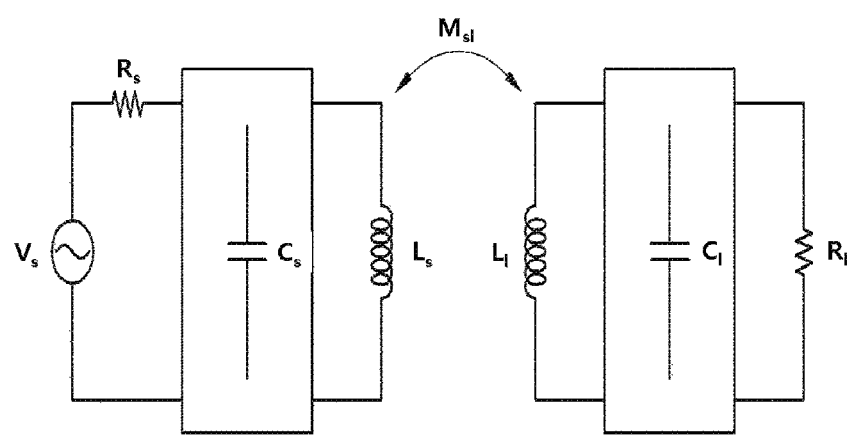
FIG. 1 is a diagram showing a magnetic induction type equivalent circuit.

Hereinafter, a wireless power transfer system including a transfer device including a function for wirelessly transferring power and a reception device for wirelessly receiving power according to embodiments will be described in detail with reference to the accompanying drawings. The embodiments described below are merely provided by way of example in order to allow the spirit of the present invention to be sufficiently conveyed to those skilled in the art. Thus, the embodiments are not limited to the embodiments described below and may be embodied in other forms. In addition, in the drawings, for example, sizes and thicknesses of constituent elements of a device may be exaggerated for convenience. The same reference numbers will be used throughout the specification to refer to the same or like constituent elements.

In the embodiments, various frequency bands from a low frequency (50 kHz) to a high frequency (15 MHz) may be selectively used for wireless power transfer and a communication system capable of exchanging data and control signals for system control may be included.

Embodiments are applicable to the mobile terminal industry, the smart watch industry and the computer and laptop industries, the home appliance industry, the electric vehicle industry, the medical device industry, robotics, etc. using electronic devices which use or require respective batteries.

In Embodiments, a system capable of transferring power to one or more apparatuses using one or a plurality of transfer coils may be considered.

According to embodiments, a battery shortage problem of a mobile device such as a smartphone or a laptop may be solved. For example, when a smartphone or a laptop is used in a state of being placed on a wireless charging pad located on a table, the battery may be automatically charged and thus the smartphone or the laptop can be used for a long time. In addition, when a wireless charging pad is installed in public places such as cafés, airports, taxis, offices and restaurants, various mobile apparatuses can be charged regardless of the type of the charging terminal changed according to mobile apparatus manufacturer. In addition, when wireless power transfer technology is applied to household appliances such as cleaners, electric fans, etc., effort to find a power cable is not necessary and complicated wires are not required in the home, thereby reducing the number of wires in a building and making better use of space. In addition, charging an electric vehicle using a household power supply takes considerable time. In contrast, when high power is transferred through wireless power transfer technology, charging time can be reduced. In addition, when wireless charging equipment is mounted in a parking area, a power cable does not need to be provided near the electric vehicle.

The terms and abbreviations used in the embodiments will now be described.

Wireless Power Transfer System: System for wirelessly transferring power within a magnetic field. Transfer device (Wireless Power Transfer System-Charger; Power Transfer Unit: PTU): Device for wirelessly transferring power to a power receiver in a magnetic field and managing the system, which may be referred to as a transfer device or a transmitter.

Reception device (Wireless Power Receiver System-Device; Power Receiver Unit: PRU): Device for wirelessly receiving power from a power transmitter in a magnetic field, which may be referred to as a reception device or a receiver.

Charging Area: Area in which wireless power transfer is performed in a magnetic field and which may be changed according to the size, desired power or operating frequency of an application product.

S parameter (Scattering parameter): Ratio of an input voltage to an output voltage in a frequency distribution, that is, a ratio of an input port to an output port (Transmission; S21) or a reflection value of an input/output port, that is, an output value returned by reflection of an input value (Reflection; S11, S22).

Q (Quality factor): In resonance, a value Q means frequency selection quality. As the Q value increases, a resonance property becomes better, and the Q value is represented by a ratio of energy stored in a resonator to lost energy.

Examples of the principle of wirelessly transferring power include a magnetic induction method and a magnetic resonance method.

The magnetic induction method uses a non-contact energy transmission technology for providing a source inductor $L_s$ and a load inductor $L_1$ close to each other and generating electromotive force in the load inductor $L_1$ by magnetic flux generated when current flows in the source inductor $L_s$. The magnetic resonance method uses technology for wirelessly transferring energy using a resonance method of generating magnetic resonance by a natural frequency between two resonators and forming an electric field and a magnetic field in the same wavelength range while vibrating with the same frequency.

FIG. 1 is a diagram showing a magnetic induction type equivalent circuit.

Referring to FIG. 1, in a magnetic induction type equivalent circuit, a transfer unit may be implemented by a source voltage $V_s$ according to a device for supplying power, a source resistor $R_s$, and a source capacitor $C_s$ for impedance matching, and a source coil Ls for magnetic coupling with a reception unit, and the reception unit may be implemented by a load resistor $R_1$ which is an equivalent resistor of the reception unit, a load capacitor $C_1$ for impedance matching and a load coil $L_1$ for magnetic coupling with the transfer unit. Magnetic coupling between the source coil $L_s$ and the load coil $L_1$ may be represented by mutual inductance $M_{s1}$.

In FIG. 1, when a ratio S21 of an input voltage to an output voltage is obtained from a magnetic induction equivalent circuit including only coils without the source capacitor $C_s$ and the load capacitor $C_1$ for impedance matching, a maximum power transfer condition satisfies Equation 1 below.

$$L_s/R_s = L_l/R_l \qquad \text{Equation 1}$$

According to Equation 1 above, when a ratio of inductance of the transfer coil $L_s$ to the source resistor $R_s$ is equal to a ratio of the inductance of the load coil $L_1$ to the load resistor $R_1$, maximum power transfer is possible.

In a system including only inductance, since a capacitor capable of compensating for reactance is not present, the reflection value S11 of the input/output port cannot become 0 at a maximum power transfer point and power transfer efficiency can be significantly changed according to mutual inductance $M_{sl}$. Therefore, as a compensation capacitor for impedance matching, the source capacitor $C_s$ may be added to the transfer unit and the load capacitor $C_1$ may be added to the reception unit. The compensation capacitors $C_s$ and $C_1$ may be connected to the reception coil $L_s$ and the load coil $L_1$ in series or in parallel, respectively. In addition, for impedance matching, passive elements such as additional capacitors and inductors may be further included in the transfer unit and the reception unit, in addition to the compensation capacitors.

Figure 2:
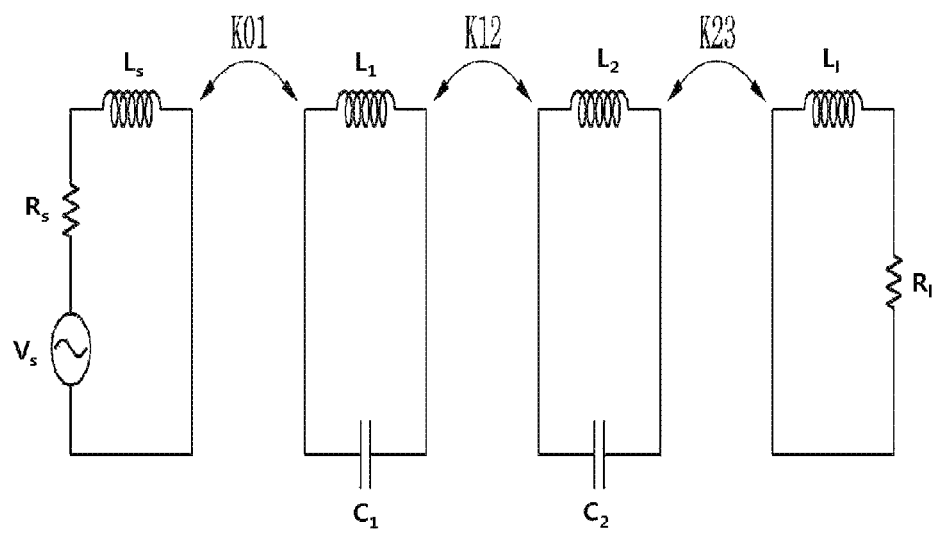
FIG. 2 is a diagram showing a magnetic resonance type equivalent circuit.

FIG. 2 is a diagram showing a magnetic resonance type equivalent circuit.

Referring to FIG. 2, in the magnetic resonance type equivalent circuit, a transfer unit is implemented by a source coil configuring a closed circuit by series connection of a source voltage $V_s$, a source resistor $R_s$ and a source inductor $L_s$ and a transfer-side resonant coil configuring a closed circuit by series connection of a transfer-side resonant inductor $L_1$ and a transfer-side resonant capacitor $C_1$, and a reception unit is implemented by a load coil configuring a closed circuit by series connection of a load resistor $R_1$ and a load inductor $L_1$ and a reception-side resonant coil configuring a closed circuit by series connection of a reception-side resonant inductor $L_2$ and a reception-side resonant capacitor $C_2$. The source inductor $L_s$ and the transfer-side inductor $L_1$ are magnetically coupled with a coupling coefficient of K01, the load inductor $L_1$ and the load-side resonant inductor $L_2$ are magnetically coupled with a coupling coefficient of K23, and the transfer-side resonant inductor $L_1$ and the reception-side resonant inductor $L_2$ are coupled with a coupling coefficient of K12. In an equivalent circuit of another embodiment, the source coil and/or the load coil may be omitted and only the transfer-side resonant coil and the reception-side resonant coil may be included.

In the magnetic resonance method, when the resonant frequencies of the two resonators are equal, most of the energy of the resonator of the transfer unit may be transferred to the resonator of the reception unit, thereby improving power transfer efficiency. Efficiency of the magnetic resonance method becomes better upon satisfying Equation 2 below.

$$k/\Gamma >> 1 (k \text{ being a coupling coefficient and } \Gamma \text{ being a damping ratio})$$ Equation 2

In order to increase efficiency in the magnetic resonance method, impedance matching elements may be added and the impedance matching elements may be passive elements such as an inductor and a capacitor.

A WPT system for transferring power using a magnetic induction method or a magnetic resonance method based on the wireless power transfer principle will now be described.

<Transfer Unit>

Figure 3A:
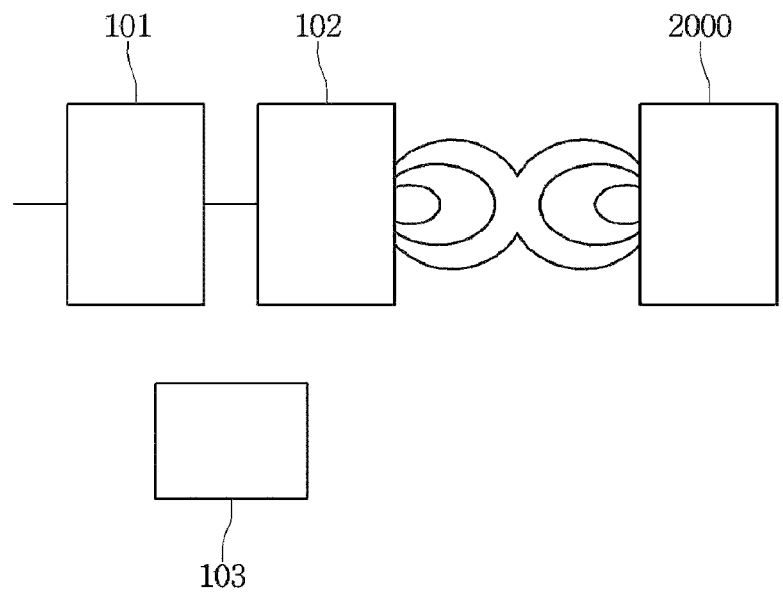
FIGS. 3a and 3b are block diagrams showing a transfer unit as one of subsystems configuring a wireless power transfer system.
Figure 3B:
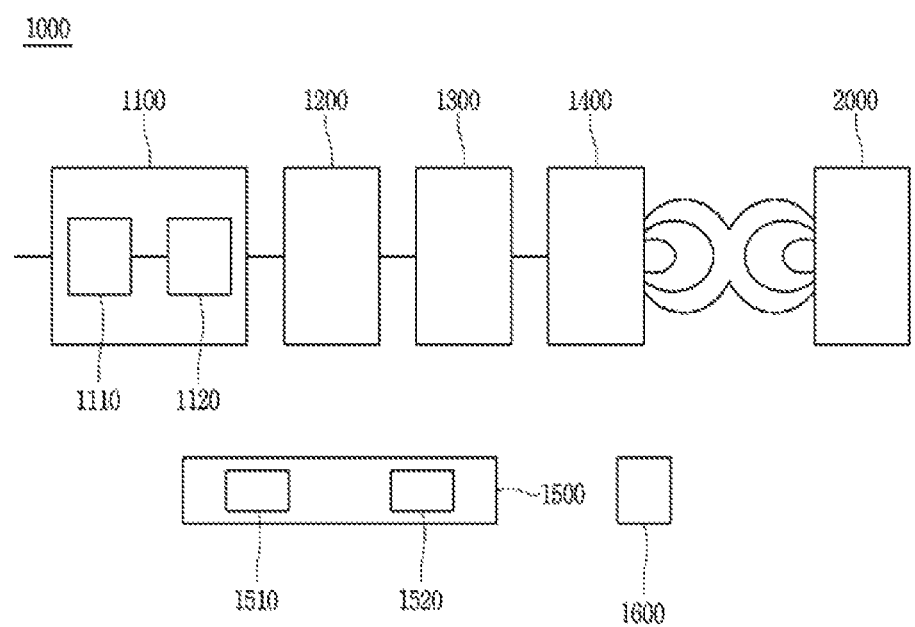

FIGS. 3a and 3b are block diagrams showing a transfer unit as one of subsystems configuring a wireless power transfer system.

Referring to FIG. 3a, the wireless power transfer system according to the embodiment may include a transfer unit 1000 and a reception unit 2000 for wirelessly receiving power from the transfer unit 1000. The transfer unit 1000 may include a transfer-side power converter 101 for performing power conversion with respect to an input AC signal and outputting an AC signal, a transfer-side resonant circuit unit 102 for generating a magnetic field based on the AC signal output from the transfer-side power converter 101 and supplying power to the reception unit 2000 in a charging area, and a transfer-side controller 103 for controlling power conversion of the transfer-side power converter 101, adjusting the amplitude and frequency of the output signal of the transfer-side power converter 101, performing impedance matching of the transfer-side resonant circuit unit 102, sensing impedance, voltage and current information from the transfer-side power converter 101 and the transfer-side resonant circuit 102 and performing wireless communication with the reception unit 2000. The transfer-side power converter 101 may include at least one of a power converter for converting an AC signal into a DC signal, a power converter for changing the level of a DC signal and outputting a DC signal, and a power converter for converting a DC signal into an AC signal. The transfer-side resonant circuit unit 102 may include a coil and an impedance matching unit resonating with the coil. In addition, the transfer-side controller 103 may include a sensing unit for sensing impedance, voltage and current information and a wireless communication unit.

In addition, referring to FIG. 3b, the transfer unit 1000 may include a transfer-side AC/DC converter 1100, a transfer-side DC/AC converter 1200, a transfer-side impedance matching unit 1300, a transfer coil unit 1400 and a transfer-side communication and control unit 1500.

The transfer-side AC/DC converter 1100 may convert an externally input AC signal into a DC signal under control of the transfer-side communication and control unit 1500 and may include a rectifier 1110 and a transfer-side AC/AC converter 1120 as subsystems. The rectifier 1110 is a system for converting the received AC signal into a DC signal and may be implemented by a diode rectifier having relatively high efficiency upon high-frequency operation, a synchronous rectifier capable of being built in one chip, and a hybrid rectifier capable of reducing cost and space and a high degree of freedom in terms of a dead time. The embodiments are not limited thereto and any system for converting an AC signal into a DC signal is applicable. In addition, the transfer-side DC/DC converter 1120 adjusts the level of the DC signal received from the rectifier 1110 under control of the transfer-side communication and control unit 1500, and examples thereof include a buck converter for decreasing the level of an input signal, a boost converter for increasing the level of an input signal, and a buck boost converter for decreasing or increasing the level of an input signal, or a Ćuk converter. In addition, the transfer-side DC/DC converter 1120 may include a switch element for performing a power conversion control function, an inductor and capacitor for performing a power conversion intermediation function or an output voltage smoothing function, a transformer for performing a voltage gain adjustment or electrical separation (insulation) function, etc., and perform a function for removing a ripple component or pulsatory component (AC component included in the DC signal) included in the input DC signal. A difference between the command value of the output signal of the transfer-side DC/DC converter 1120 and an actual output value may be adjusted through a feedback method, which may be performed by the transfer-side communication and control unit 1500.

The transfer-side DC/AC converter 1200 is a system for converting the DC signal output from the transfer-side AC/DC converter 1100 into an AC signal under control of the transfer-side communication and control unit 1500 and adjusting the frequency of the converted AC signal, and examples thereof include a half-bridge inverter or a full-bridge inverter. The wireless power transfer system may include various amplifiers for converting DC into AC, e.g., A-class, B-class, AB-class, C-class, E-class and F-class amplifiers. In addition, the transfer-side DC/AC converter 1200 may include an oscillator for generating the frequency of the output signal and a power amplifier for amplifying the output signal.

The AC/DC converter 1100 and the transfer-side DC/AC converter 1200 may be replaced by an AC power supply, omitted or replaced by another element.

The transfer-side impedance matching unit 1300 minimizes a reflected wave to enable the signal to smoothly flow at a point having different impedances. Since the two coils of the transfer unit 1000 and the reception unit 2000 are separated from each other, the magnetic field is significantly leaked. Therefore, an impedance difference between the two connection ends of the transfer unit 1000 and the reception unit 2000 may be corrected, thereby improving power transfer efficiency. The transfer-side impedance matching unit 1300 may include at least one of an inductor, a capacitor and a resistor and change inductance of the inductor, capacitance of the capacitor and resistance of the resistor under control of the communication and control unit 1500, thereby adjusting the impedance value for impedance matching. When the wireless power transfer system transfers power using the magnetic induction method, the transfer-side impedance matching unit 1300 may have a series resonant structure or a parallel resonant structure and increase an induction coupling coefficient between the transfer unit 1000 and the reception unit 2000, thereby minimizing energy loss. When the wireless power transfer system transfers power using the magnetic resonance method, the transfer-side impedance matching unit 1300 may correct impedance matching in real time by change in matching impedance on an energy transmission line due to change in distance between the transfer unit 1000 and the reception unit 2000 or change in properties of the coil according to mutual influence of a plurality of devices and metal foreign objects (FOs). Examples of the correction method may include a multi-matching method using a capacitor, a matching method using multiple antennas and a method using multiple loops.

The transfer-side coil 1400 may be implemented by one or a plurality of coils. If the transfer-side coil 1400 includes a plurality of coils, the coils may be spaced apart from each other or overlap each other. If the coils overlap each other, the overlapping area may be determined in consideration of a flux density variation. In addition, the transfer-side coil 1400 may be manufactured in consideration of internal resistance and radiation resistance. At this time, if a resistance component is small, a quality factor may be increased and transmission efficiency may be increased.

The communication and control unit 1500 may include a transfer-side controller 1510 and a transfer-side communication unit 1520. The transfer-side controller 1510 may be responsible for adjusting the output voltage of the transfer-side AC/DC converter 1100 (or current Itx_coil flowing in the transfer coil) in consideration of at least one of desired power of the reception unit 2000, a current charging amount, the voltage Vrect of the rectifier output terminal of the reception unit, charging efficiency of each of a plurality of reception units and a wireless power transfer method. In consideration of maximum power transfer efficiency, frequencies and switching waveforms for driving the transfer-side DC/AC converter 1200 may be generated to control power to be transferred. In addition, overall operation of the reception unit 2000 may be controlled using an algorithm, program or application read from a memory (not shown) of the reception unit 2000 and required for control. Meanwhile, the transfer-side controller 1510 may be referred to as a microprocessor, a microcontroller unit, or a Micom. The transfer-side communication unit 1520 may perform communication with the reception-side communication unit 2620 and examples of the communication method may include a short-range communication method such as Bluetooth, NFC or ZigBee. The transfer-side communication unit 1520 and the reception-side communication unit 2620 may transmit and receive charging state information and charging control commands. The charging state information may include the number of reception units 2000, a battery residual amount, the number of times of charging, a battery capacity, a battery ratio and a transmit power amount of the transfer unit 1000. In addition, the transfer-side communication unit 1520 may transmit a charging function control signal for controlling the charging function of the reception unit 2000, and the charging function control signal may be a control signal for controlling the reception unit 2000 to enable or disable the charging function.

The transfer-side communication unit 1520 may perform communication in an out-of-band format as a separate module. Embodiments are not limited thereto and communication may be performed in an in-band format for enabling a transfer unit to transfer a signal to a reception unit using feedback shift sent from the reception unit to the transfer unit using a power signal transferred by the transfer unit and frequency shift of the power signal transferred by the transfer unit. For example, the reception unit may modulate the feedback signal and transfer charging start, charging end and battery state information to the transfer unit through the feedback signal. In addition, the transfer-side communication unit 1520 may be configured separately from the transfer-side controller 1510. In the reception unit 2000, the reception-side communication unit 2620 may be included in the controller 2610 of the reception device or be provided separately from the controller 1610 of the reception device.

In addition, the transfer unit 1000 of the wireless power transfer system according to the embodiment may further include a detector 1600. The detector may detect at least one of the input signal of the transfer-side AC/DC converter 1100, the output signal of the transfer-side AC/DC converter 1100, the input signal of the transfer-side DC/AC converter 1200, the output signal of the transfer-side DC/AC converter 1200, the input signal of the transfer-side impedance matching unit 1300, the output signal of the transfer-side impedance matching unit 1300, the input signal of the transfer-side coil 1400 or the signal of the transfer-side coil 1400. For example, the signal may include at least one of information on current, information on voltage or information on impedance. The detected signal is fed back to the communication and control unit 1500. The communication and control unit 1500 may control the transfer-side AC/DC converter 1100, the transfer-side DC/AC converter 1200 and the transfer-side impedance matching unit 1300 based on the detected signal. In addition, the communication and control unit 1500 may perform foreign object detection (FOD) based on the result detected by the detector 1600. The detected signal may be at least one of a voltage and current. Meanwhile, the detector 1600 may be implemented in hardware different from that of the communication and control unit 1500 or the detector 1600 and the communication and control unit 1500 may be implemented together in hardware.

<Reception Unit>

Figure 4A:
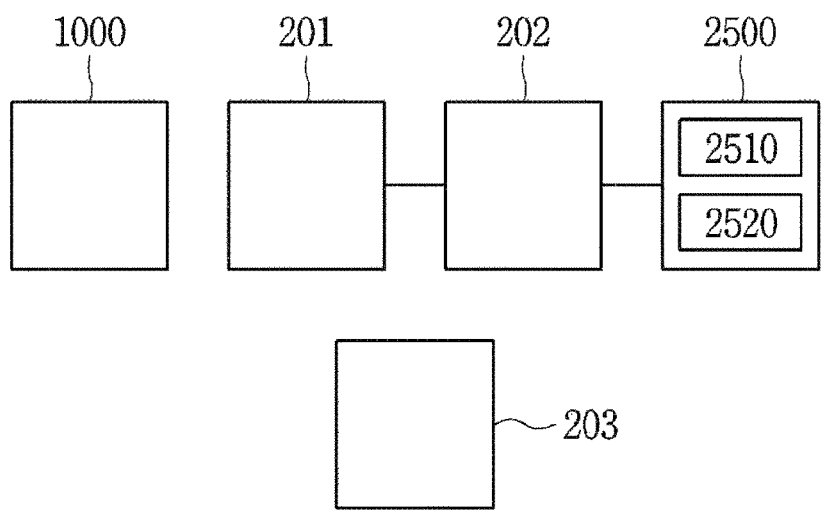
FIGS. 4a and 4b are block diagrams showing a reception unit as one of subsystems configuring a wireless power transfer system.
Figure 4B:
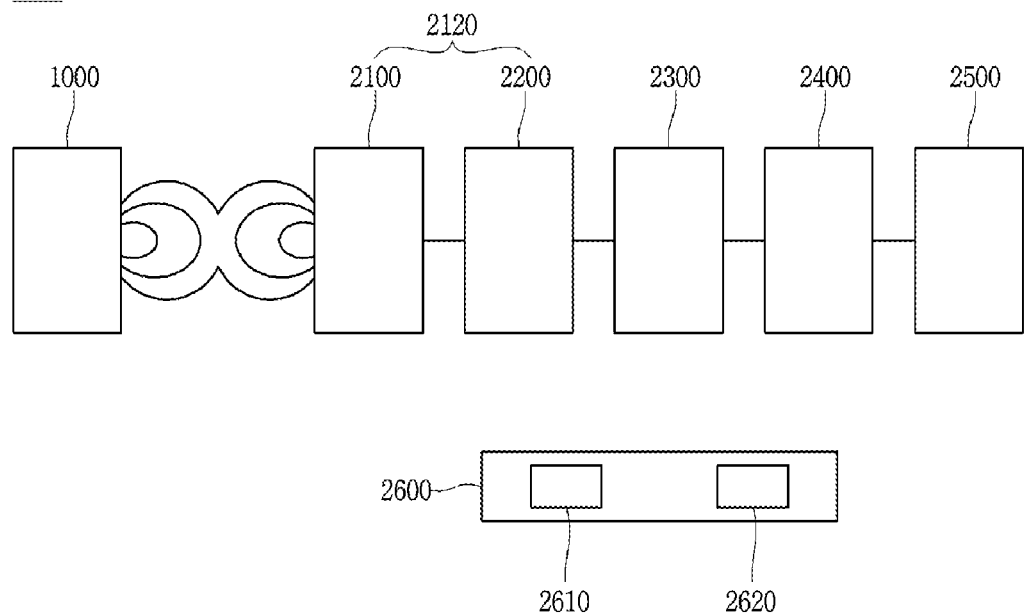

FIGS. 4*a* and 4*b* are block diagrams showing a reception unit (or a reception device) as one of subsystems configuring a wireless power transfer system. Referring to FIG. 4*a*, the wireless power transfer system according to the embodiment may include a transfer unit 1000 and a reception unit 2000 for wirelessly receiving power from the transfer unit 1000. The reception device 2000 may include a reception-side resonant circuit unit 201 for receiving an AC signal from the transfer device 1000, a reception-side power converter 202 for performing power conversion of AC power from the reception-side resonant circuit unit 201 and outputting a DC signal, a load 2500 charged by receiving the DC signal output from the reception-side power converter 202, and a reception-side controller 203 for sensing the current/voltage of the reception-side resonant circuit unit 201, performing impedance matching of the reception-side resonant circuit unit 201, controlling power conversion of the reception-side power converter 202, adjusting the level of the output signal of the reception-side power converter 202, or sensing input or output voltage or current of the reception-side power converter 202, controlling supply of the output signal of the reception-side power converter 202 to the load 2500 or performing communication with the transfer device 1000. The reception-side power converter 202 may include at least one of a power converter for converting an AC signal into a DC signal, a power converter for changing the level of a DC signal and outputting a DC signal, and a power converter for converting a DC signal into an AC signal. In addition, referring to FIG. 4*b*, the wireless power transfer system according to the embodiment may include a transfer unit (or a transfer device) 1000 and a reception unit (or a reception device) 2000 for wirelessly receiving power from the transfer unit 1000. The reception unit 2000 may include a reception-side resonant circuit unit 2120 including a reception-side coil unit 2100 and a reception-side impedance matching unit 2200, a reception-side AC/DC converter 2300, a DC/DC converter 2400, a load 2500 and a reception-side communication and control unit 2600. The reception-side AC/DC converter 2300 may be referred to as a rectifier for rectifying an AC signal into a DC signal.

The reception-side coil unit 2100 may receive power through the magnetic induction method or the magnetic resonance method. At least one of an induction coil or a resonant coil may be included according to the power reception method.

As one embodiment, the reception-side coil unit 2100 may be provided in a portable terminal along with a near field communication (NFC) antenna. The reception-side coil unit 2100 may be equal to the transfer-side coil unit 1400 and the size of the reception antenna may be changed according to the electrical properties of the reception unit 2000.

The reception-side impedance matching unit 2200 may perform impedance matching between the transfer unit 1000 and the reception unit 2000.

The reception-side AC/DC conversion unit 2300 rectifies the AC signal output from the reception-side coil unit 2100 and generates a DC signal. The output voltage of the reception-side AC/DC converter 2300 may be referred to as a rectified voltage Vrect. The reception-side communication and control unit 2600 may detect or change the output voltage of the reception-side AC/DC converter 2300 and transmit, to the transfer unit 100, state parameter information such as information on a minimum rectified voltage Vrect_min (or a minimum output voltage Vrect_min) as a minimum value of the output voltage of the reception-side AC/DC converter 2300, a maximum rectified voltage (Vrect_max)(or a maximum output voltage (Vrect_max)) as a maximum value, an optimal rectified voltage Vrect_set (or an optimal output voltage Vrect_set) having any one of the minimum value and the maximum value.

The reception-side DC/DC converter 2400 may adjust the level of the DC signal output from the reception-side AC/DC converter 2300 according to the capacity of the load 2500.

The load 2500 may include a battery, a display, an audio output circuit, a main processor, a battery manager and various sensors. The load 2500 may include at least a battery 2510 and a battery manager 2520 as shown in FIG. 4a. The battery manager 2520 may sense the charging state of the battery 2510 to adjust the voltage and current applied to the battery 2510.

The reception-side communication and control unit 2600 may be activated by wakeup power from the transfer-side communication and control unit 1500 to perform communication with the transfer-side communication and control unit 1500 and to control operation of the subsystem of the reception unit 2000.

One or a plurality of reception units 2000 may be included to simultaneously and wirelessly receive energy from the transfer unit 1000. That is, in the magnetic resonance type wireless power transfer system, a plurality of target reception units 2000 may receive power from one transfer unit 1000. At this time, the transfer-side matching unit 1300 of the transfer unit 1000 may adaptively perform impedance matching between the plurality of reception units 2000. This is equally applicable to the case in which a plurality of reception-side coil units independent of each other in the magnetic induction method is included.

In addition, if a plurality of reception units 2000 is provided, power reception methods may be equal or different. In this case, the transfer unit 1000 may transfer power using the magnetic induction method, the magnetic resonance method or a combination thereof.

Meanwhile, in a relation between the level and frequency of the signal of the wireless power transfer system, in the case of magnetic induction type wireless power transfer, in the transfer unit 1000, the transfer-side AC/DC converter 1100 may receive and convert an AC signal of several tens or several hundred Hz (e.g., 60 Hz) of several tens or several hundred V (e.g., 110 V to 220 V) into a DC signal of several V to several tens or several hundred V (e.g., 10 to 20 V) and the transfer-side DC/AC converter 1200 receives a DC signal and output an AC signal of kHz band (e.g., 125 kHz). The reception-side AC/DC converter 2300 of the reception unit 2000 may receive and convert an AC signal of KHz band (e.g., 125 kHz) into a DC signal of several V to several tens or several hundred V (e.g., 10 V to 20 V), and the reception-side DC/DC converter 2400 may output a DC signal of 5 V, which is suitable for the load 2500, to the load 2500. In the case of magnetic resonance type wireless power transfer, in the transfer unit 1000, the transfer-side AC/DC converter 1100 may receive and convert an AC signal of several tens or several hundreds of Hz (e.g., 60 Hz) of several tens or several hundred V (e.g., 110 V to 220 V) into a DC signal of several V to several tens or several hundred V (e.g., 10 to 20 V), and the transfer-side DC/AC converter 1200 receives a DC signal and outputs an AC signal of MHz band (e.g., 6.78 MHz). The reception-side AC/DC converter 2300 of the reception unit 2000 may receive and convert an AC signal of MHz band (e.g., 6.78 MHz) into a DC signal of several V to several tens or several hundred V (e.g., 10 V to 20 V) and the reception-side DC/DC converter 2400 may output a DC signal of 5 V, which is suitable for the load 2500, to the load 2500.

<Operation State of Transfer Device>

Figure 5:
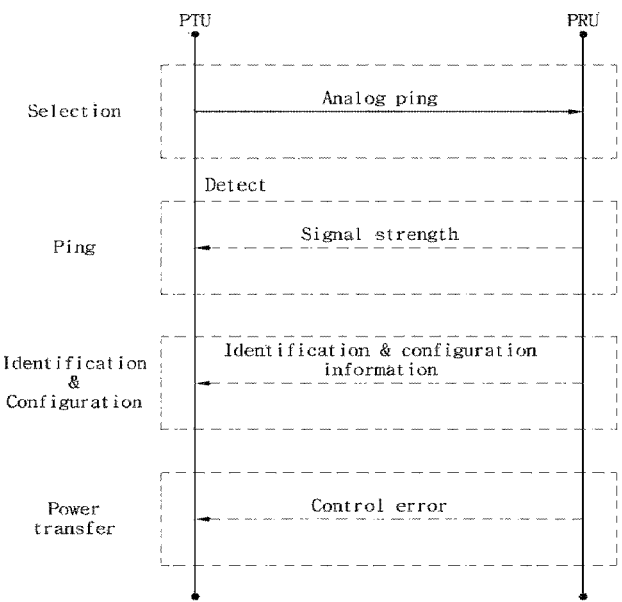
FIG. 5 is a flowchart illustrating operation of a wireless power transfer system, which focuses on an operation phase of a transfer device according to an embodiment.

FIG. 5 is a flowchart illustrating operation of a wireless power transfer system, which focuses on an operation state of a transfer device according to an embodiment.

Referring to FIG. 5, the transfer device according to the embodiment may have at least 1) a selection phase, 2) a ping phase, 3) an identification and configuration phase, 4) a power transfer phase and a charging end phase.

[Selection Phase]

(1) In the selection phase, the transfer device 1000 may perform a ping process in order to select the reception device 200 in a sensing area or a charging area.

(2) The sensing area or the charging area may mean an area in which an object influences the power properties of the transfer-side power converter 101, as described above. As compared to the ping phase, in the selection phase, a ping process for selection of the reception device 200 is a process of detecting change in amount of power forming a wireless power signal in the power converter of the transfer device 1000 and checking whether an object is present in a predetermined range, instead of a method of receiving a response from the reception device 2000 using a power control message. The ping process of the selection phase may be referred to as an analog ping process because an object is detected using a wireless power signal, not using a digital packet of the below-described ping phase.

(3) In the selection phase, the transfer device 1000 may sense that an object enters or exits the sensing area or the charging area. In addition, the transfer device 1000 may distinguish the reception device 2000 capable of wirelessly transferring power and the other objects (keys, coins, etc.) from objects in the sensing area or the charging area.

As described above, since a wireless power transfer distance is changed according to an induction coupling method and a resonance coupling method, the sensing area in which an object is detected in the selection phase may be changed.

(4) First, if power is transferred according to the induction coupling method, the transfer device 1000 in the selection phase may monitor an interface surface (not shown) in order to sense placement and removal of objects.

In addition, the transfer device 1000 may sense the position of the wireless power reception device 2000 located on the interface surface.

(5) When the transfer device 1000 includes one or more transfer coils, the selection phase transitions to the ping phase. In the ping phase, whether a response to the ping signal is transferred from the object is determined using each coil or the transfer device enters the identification phase to determine whether identification information is transferred from the object.

The transfer device 1000 may determine coils to be used for wireless power transfer based on the position of the reception device 2000 acquired through such a process.

(6) In addition, when power is transferred according to the resonance coupling method, the transfer device 1000 in the selection phase may sense that one or more of the frequency, current and voltage of the power converter are changed due to the object in the sensing area or the charging area, thereby detecting the object.

(7) The transfer device 1000 in the selection phase may detect an object using at least one of detection methods according to the induction coupling method and the resonance coupling method.

(8) The transfer device 1000 may perform an object ping process according to a power transfer method and select an object detection method from among coupling methods for wireless power transfer in order to proceed to subsequent phases.

(9) Meanwhile, a wireless power signal formed by the transfer device 1000 in the selection phase in order to detect an object and a wireless power signal formed for digital detection, identification, configuration and power transfer may be different in terms of properties such as frequency or strength. The selection phase of the transfer device 1000 corresponds to an idle phase for detecting an object, such that the transfer device 100 generates a signal specialized for efficient object detection or power consumption reduction.

[Ping Phase]

(1) In the ping phase, the transfer device 1000 may perform a process of detecting the reception device 2000 in the'sensing area or the charging area through a power control message. As compared to the ping process of the reception device 200 using the properties of the wireless power signal in the selection phase, the ping process in the ping phase may be referred to as a digital ping process.

(2) The transfer device 1000 may form a wireless power signal for detecting the reception device 2000, demodulate the wireless power signal modulated by the reception device 2000, and acquire a power control message of a digital data format corresponding to the response to the ping signal from the demodulated wireless power signal.

(3) The transfer device 1000 receives the power control message corresponding to the response to the ping signal, thereby recognizing the reception device 2000, to which power will be transferred.

(4) The ping signal formed by the transfer device 1000 in the ping phase in order to perform the digital ping process may be a wireless power signal formed by applying a power signal of a specific operation pint for a predetermined time.

Here, the operating point may mean the frequency, duty cycle and amplitude of the voltage applied to the transfer coil unit 1400.

The transfer device 1000 may generate the ping signal by applying the power signal of the specific operating point for the predetermined time and attempt to receive the power control message from the reception device 2000.

(5) Meanwhile, the power control message corresponding to the response to the ping signal may be a message indicating the strength of the wireless power signal received by the reception device 2000. For example, the reception device 2000 may transmit a signal strength packet included in the message indicating the strength of the wireless power signal received as a response to the ping signal. The packet may be configured to include a header indicating a packet indicating signal strength and a message indicating the strength of the power signal received by the reception device 2000. The strength of the power signal in the message may indicate a degree of induction or resonance coupling for transfer of power between the transfer device 1000 and the reception device 2000.

(6) The transfer device 1000 may extend the digital ping process and enter the identification and configuration phase after receiving the response message to the ping signal and finding the reception device 2000. That is, the transfer device 1000 may maintain the power signal of the specific operating point and receive a necessary power control message in the identification and configuration phase, after finding the reception device 2000.

However, when the transfer device 100 does not find the reception device 2000, to which power is transferred, the operation phase of the transfer device 1000 may be returned to the selection phase.

[Identification and Configuration Phase]

(1) In the identification and configuration phase, the transfer device 1000 may receive identification information and/or configuration information from the reception device 2000 to efficiently control power transfer.

(2) In the identification and configuration phase, the reception device 2000 may transmit a power control message including the identification information thereof. To this end, the reception device 2000 may transmit an identification packet including a message indicating the identification information of the reception device 2000. The packet may be configured to include a header indicating a packet indicating the identification information and a message including the identification information of the reception device 2000. The message may be configured to include information indicating the version of the protocol for wireless power transfer, information for identifying the manufacturer of the reception device 2000, information indicating presence/absence of an extended device identifier and a basic device identifier. In addition, if the information indicating presence/absence of the extended device identifier indicates that the extended device identifier is present, an extended identification packet including the extended device identifier may be separately transmitted. The packet may be configured to include a header indicating a packet indicating the extended device identifier and a message including the extended device identifier. If the extended device identifier is used, information based on the identification information of the manufacturer, the basic device identifier and the extended device identifier may be used to identify the reception device 2000.

(3) In the identification and configuration phase, the reception device 2000 may transmit a power control message including information on predicted maximum power. To this end, the reception device 2000 may transmit a configuration packet, for example. The packet may be configured to include a packet indicating the configuration packet and a message including information on the predicted maximum power.

In addition, the reception device 2000 may transmit a power control message including information on a receivable power amount. The information on the receivable power amount of the reception device 2000 may be provided to the transfer device 1000 even in the power transfer phase, not in the identification and configuration phase.

The message may be configured to include a power class, information on predicted maximum power, an indicator indicating a method of determining current of a main cell of the wireless power transfer device 1000 and the number of selective configuration packets. The indicator may indicate whether the current of the main cell of the transfer device 1000 is determined according to wireless power transfer contract.

(4) Meanwhile, the transfer device 1000 may generate power transfer contracts used for the reception device 2000 and power charging based on the identification information and/or the configuration information. The power transfer contract may include limits of parameters for determining the power transfer characteristics in the power transfer phase.

(5) The transfer device 1000 may end the identification and configuration phase and return to the selection phase, before entering the power transfer phase. For example, the transfer device 1000 may end the identification and configuration phase in order to find another reception device capable of wirelessly receiving power.

[Power Transfer Phase]

(1) In the power transfer phase, the transfer device 1000 transfers power to the reception device 2000.

(2) The transfer device 1000 may receive a power control message from the reception device 2000 while transferring power and adjust the properties of power applied to the transfer coil unit 1400 in correspondence with the received power control message. For example, the power control message used to adjust the power properties of the transfer coil may be included in a control error packet. The packet may be configured to include a header indicating the control error packet and a message including a control error value. The transmission 1000 may adjust power applied to the transfer coil according to the control error value. That is, if the control error value is 0, since the desired control point of the reception device 2000 is substantially equal to the actual control point of the reception device 2000, current applied to the transfer coil is maintained. The current applied to the transfer coil is decreased when the control error value is a negative value and is increased when the control error value is a positive value.

(3) In the power transfer phase, the transfer device 1000 may monitor parameters in the power transfer contract generated based on the identification information and/or the configuration information. As a result of monitoring the parameters, if transfer of power to the reception device 2000 violates the limits included in the power transfer contract, the transfer device 1000 may cancel power transfer and return to the selection phase.

(4) Meanwhile, the power transfer contract may include boundary conditions on the properties of power transferred from the transfer device 1000 to the reception device 2000 and a maximum power amount (receivable power) receivable by the reception device 2000. In addition, the power transfer contract may include overshoot generated in a transient state before transferred power is increased to reach the normal state of a target power signal and information on the receivable power or a power threshold set based on a target new power signal and the receivable power.

(5) The transfer device 1000 may end the power transfer phase based on the power control message received from the reception device 2000.

For example, when charging of the battery is completed while the battery is charged using power transferred to the reception device 2000, a power control, message for requesting end of wireless power transfer may be delivered to the transfer device 1000. In this case, the transfer device 1000 may end wireless power transfer and return to the selection phase, after receiving the message for requesting end of power transfer.

As another example, the reception device 2000 may deliver a power control message for requesting renegotiation or reconfiguration in order to update the already generated power transfer contract. The reception device 2000 may deliver a message for requesting renegotiation of the power transfer contract when requiring power less or greater in amount than the amount of currently transferred power. In this case, the transfer device 1000 may end wireless power transfer and return to the identification and configuration phase, after receiving the message for requesting renegotiation of the power transfer contract.

To this end, the message transferred by the reception device 2000 may be an end power transfer packet shown in FIG. 18, for example. The packet may be configured to include a header indicating an end power transfer packet and a message including the end power transfer code indicating the reason why power transfer ends. The end power transfer code may indicate any one of charge complete, internal fault, over temperature, over voltage, over current, battery failure, reconfigure, no response, and unknown.

Meanwhile, the transfer device 1000 may end power transfer when currently transferred transmit power, new transmit power as target power and power calculated from receivable power are equal to or greater than a power threshold.

Figure 6:
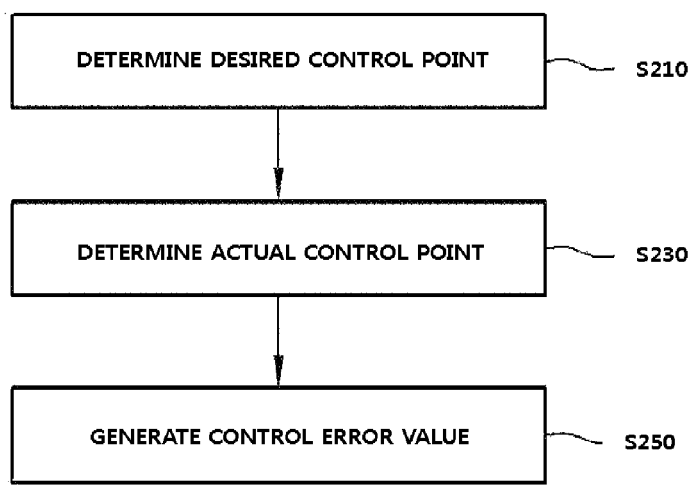
FIG. 6 is a flowchart illustrating a method determining desired power of a reception device.
Figure 7:
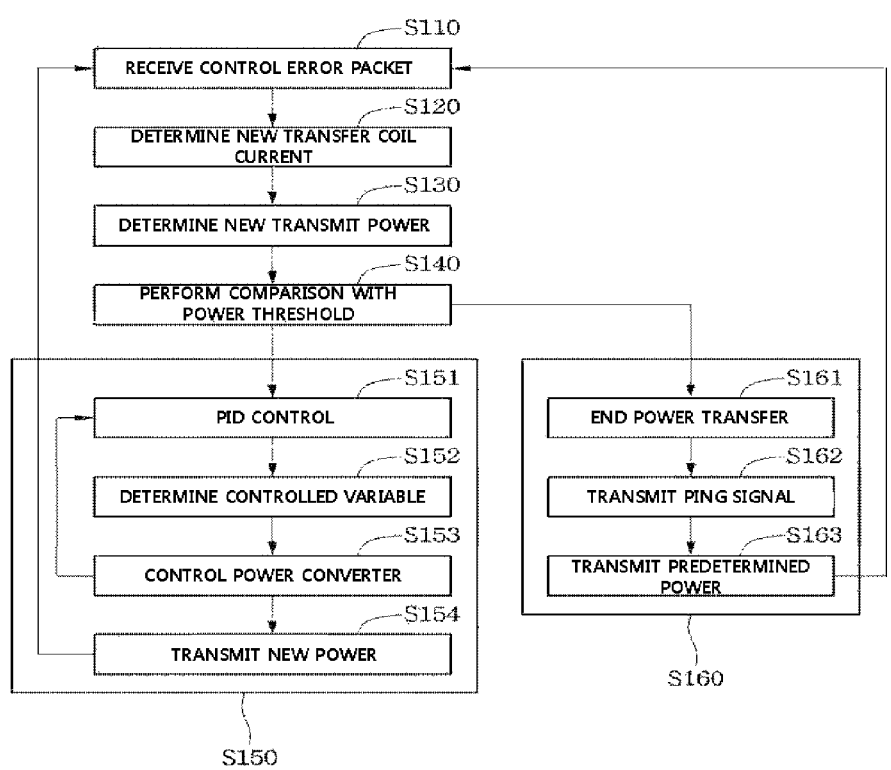
FIG. 7 is a flowchart illustrating a method of determining transmit power of a transfer device.

FIG. 6 is a flowchart illustrating a method determining desired power of a reception device, and FIG. 7 is a flowchart illustrating a method of determining transmit power of a transfer device.

<Power Transfer Control>

Method of Determining Desired Power of Reception Device

Referring to FIG. 6, the reception device 2000 may perform steps of 1) determining a desired control point (S210), 2) detecting an actual control point (S230) and 3) generating a control error value, thereby determining power to be received, that is, desired power.

Specifically, in step S210 of determining the desired control point, the reception device 2000 may determine a desired control point of voltage, current, temperature, etc. In step S230 of detecting the actual control point, the reception device 2000 may determine an actual control point of actual voltage, current, temperature, etc. The reception device 2000 may apply various methods such as voltage or current detection, temperature sensing, etc. upon determining the actual control point, and perform such a process anytime in the power transfer phase. In step S250 of generating the control error value, the reception device 2000 may generate a control error value based on a difference between the desired control voltage value and the actual control voltage value. In addition, the control error value may be a parameter indicating a positive value and a negative value. The control error value is a positive value when the desired power is less than actual power, is a negative value when the desired power is greater than actual power, and is zero when the desired power is equal to actual power.

Meanwhile, the control error value may be transferred to the transfer device 1000 in the form of a control error packet.

When new transmit power is received from the transfer device, which has received the control error value, whether the new transmit power satisfies the desired power may be determined through the above-described steps.

Meanwhile, when new transmit power is not received from the transfer device, which has received the control error value, it may be determined that power transfer ends. When a ping signal (ping phase) is received from the transfer device, a power control message may be transferred in response thereto. The transfer device 1000, which has received the power control message, may transmit wireless power in response to the power control message and the reception device 2000 may receive wireless power. That is, after the ping phase, the identification and configuration phase is not performed but the power transfer phase may be immediately performed.

Method of Determining Transmit Power of Transfer Device

Referring to FIG. 7, the transfer device 1000 may 1) receive a control error packet (S110), 2) determine new transfer coil current (S120), 3) determine new transmit power (S130), 4) perform comparison with a power threshold (S140), 5) generate new power (S150) and 6) end power transfer (S160).

The transfer device 1000 may receive the control error packet from the reception device 2000 in step S110 of receiving the control error packet and read the control error value included in the control error packet. In step S120 of determining the new transfer coil current, new transfer coil current may be determined based on the control error value of the current of the transfer coil unit 1400. In step S130 of determining new transmit power, new transmit power corresponding to the new transfer coil current may be determined. Information on the new transmit power corresponding to the new transfer coil current may be stored in a memory provided in the controller 103 or provided separately from the controller 103 as a lookup table and the controller 103 may read information on the new transmit power corresponding to the new transfer coil current from the memory. In step S140 of performing comparison with the power threshold, the receivable power of the reception device 2000, the currently transferred power and the new transmit power are compared with the power threshold to proceed to any one of step S150 of generating new power or step S160 of ending power transfer.

When the transfer device 1000 proceeds to step S150 of generating new power, proportional integral differential (PID) control, that is, PID control step S151, may be performed, a controlled variable may be determined based on PID control (S152), the power converter 101 may be controlled based on the controlled variable (S153), and new power may be transferred (S154). The reception device 1000 may transmit a next control error packet after receiving the new power.

Meanwhile, in a period from a time when the transfer device 2000 transfers a current control error packet to a time when the transfer device transfers a next control error packet, the currently transferred power may be increased to new power in correspondence with a power increasing request signal from the reception device 2000. During the period, PID control using the feedback method may be repeatedly performed. That is, as PID control is repeatedly performed, a difference between new power actually generated in the transfer coil unit 1400 and target new power may be reduced.

When the transfer device 1000 proceeds to step S160 of ending power transfer, power transfer may end (S161) and the ping signal may be transmitted (S162). In addition, when a response signal to the ping signal is received from the reception device 2000, predetermined power may be transferred (S163). The predetermined power may be power transferred in step S110 or power less than the new transmit power determined in step S130. A next control error packet may be received from the reception device 2000, which has received the predetermined power.

The transfer device 1000 may determine whether new transmit power is generated and transferred after determining new transmit power, thereby preventing overpower from being transferred to the reception device 2000.

Whether the determined new transmit power is output may be determined based on the below-described process.

<Method of Determining Whether Power is Transferred by Transfer Device>

Figure 8:
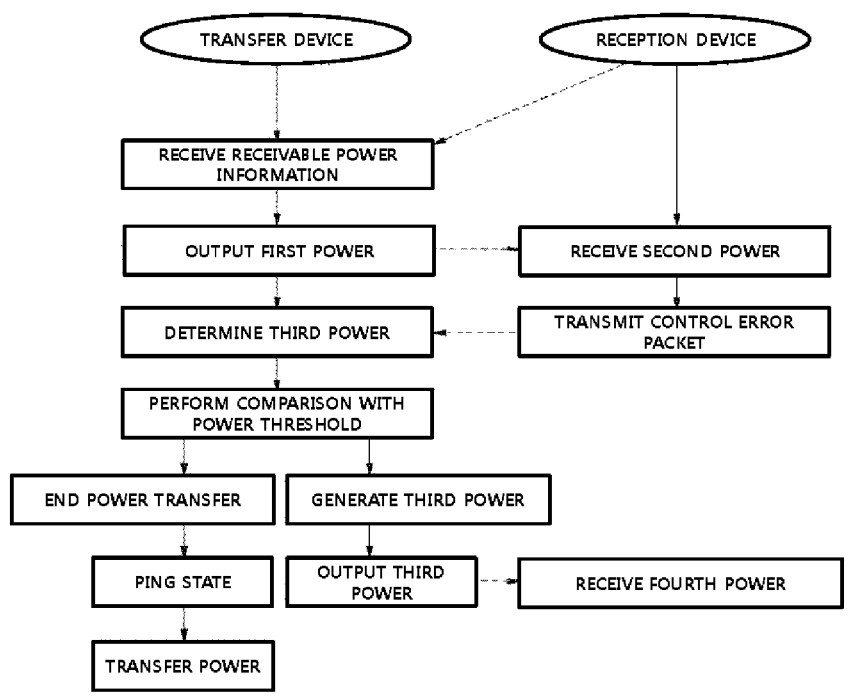
FIG. 8 is a flowchart illustrating determination as to whether a transfer device transfers power or not.
Figure 9:
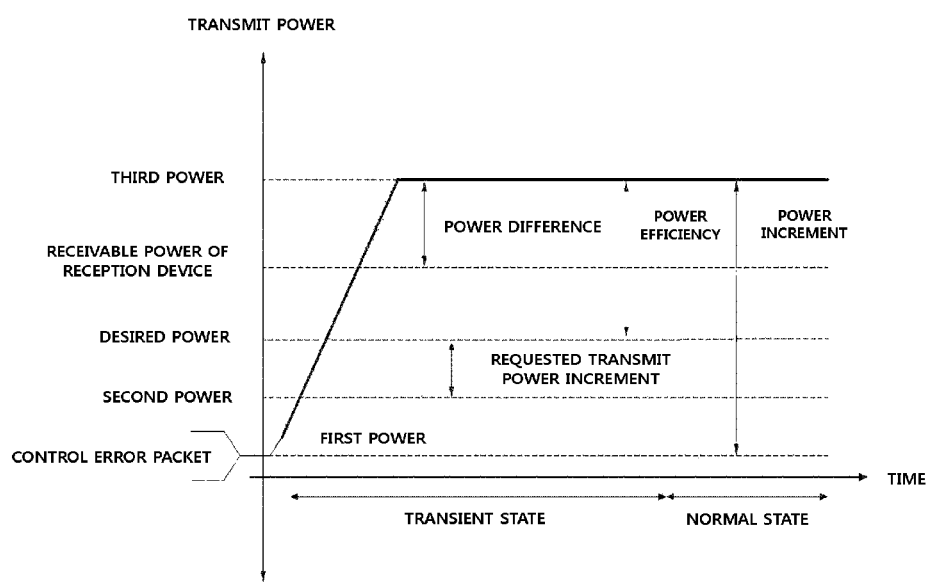
FIGS. 9 to 11 are diagrams showing a transient state and normal state of a power signal with time.
Figure 10:
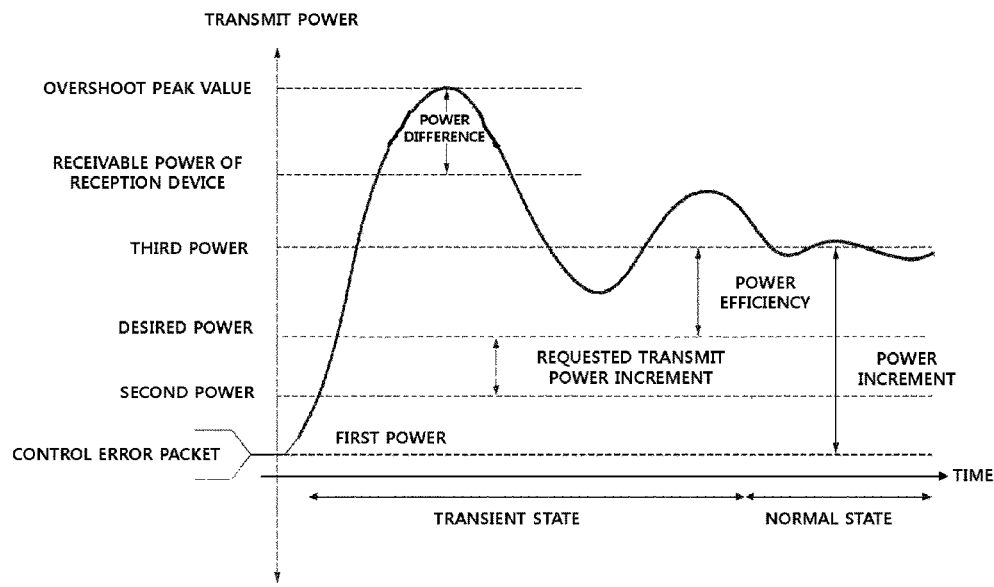
Figure 11:
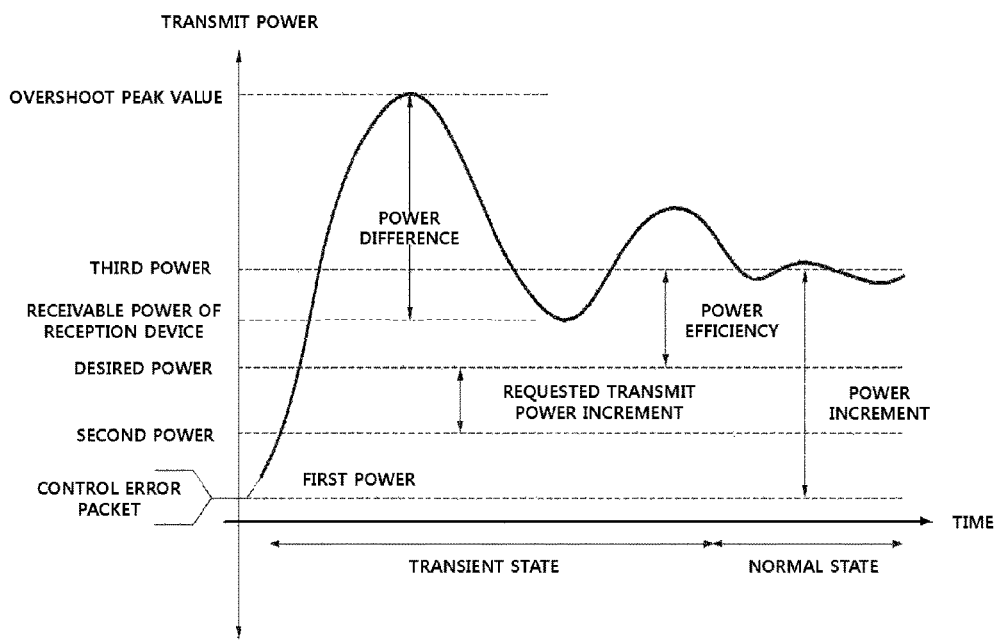

FIG. 8 is a flowchart illustrating determination as to whether a transfer device transfers power or not, and FIGS. 9 to 11 are diagrams showing a transient state and normal state of a power signal with time.

(1) In general, since power efficiency is not 100%, only some of power output from the transfer device 1000 may be received by the reception device 2000. Accordingly, in order to transfer desired power of the reception device 2000, the transfer device 1000 needs to output new transmit power greater than the desired power.

However, the transfer device 1000 may generate new transmit power remarkably greater than the desired power of the reception device 2000. In this case, the reception device 2000 may be damaged according to the amount of power excluding power received by the reception device 2000. Accordingly, in order to prevent such damage, the transfer device 1000 needs to end power transfer without generating new transmit power. This will be described in detail. (When overshoot of third power is not considered, FIG. 9)

(2) In the identification and configuration phase or the power transfer phase, the transfer device 1000 may receive a message including information on receivable power of the reception device 2000 from the reception device 2000. In the power transfer phase, the transfer device 1000 may output first power and the reception device 2000 may receive second power, which is some of the first power, according to power efficiency. If the desired power of the reception device 2000 is greater than the second power, the reception device 2000 may transmit a control error packet including a transmit power increasing request signal (the control error value is a positive value) to the transfer device 1000.

The transfer device 1000, which has received the control error packet, may determine third power greater than the first power based on the power increasing request signal of the control error packet.

Thereafter, the transfer device 1000 may determine whether the third power is generated and transferred based on the third power and the receivable power.

As the method of determining whether third power is generated and transferred, whether a difference between the third power and the receivable power exceeds a power threshold may be determined.

When Power Difference Exceeds Power Threshold (Power Transfer End)

When the power difference exceeds the power threshold, the transfer device 1000 may end power transfer without generating third power as new transmit power.

Why power transfer ends when the power difference exceeds the power threshold is because, when third power as new transmit power is output, although the reception device 2000 receives the desired power or the receivable power, the remaining power may influence the reception coil unit 2100 of the reception device 2000, thereby damaging the reception device 2000 and thus the system of the reception device 2000 may crash.

When Power Difference is Equal to or Less than Power Threshold (Power Transfer is Maintained)

When the power difference does not exceed the power threshold, the transfer device 1000 may generate and transmit third power. The reception device 2000 may receive fourth power, which is some of the third power, according to transmission efficiency. At this time, the fourth power may be desired power of the reception device 2000. If the received fourth power is different from the desired power, such error information may be included in a next control error packet to request adjustment of the amount of transmit power from the transfer device 1000.

Meanwhile, the power threshold may a value sufficient to damage the reception coil or the system of the reception device 2000 and may be experimentally predetermined according to the properties of the reception device 2000.

Meanwhile, the transfer device 1000 may receive characteristic information of the reception device 2000 including information on the receivable power, determine the power threshold from the characteristic information of the reception device 2000, and determine whether third power is generated and transferred based on the information on the receivable power and third power.

(When Overshoot of Third Power is Considered, FIGS. 10 and 11)

(3) In addition, the transfer device 1000 may receive a message including information on the receivable power of the reception device 2000 from the reception device 2000 in the identification and configuration phase or the power transfer phase. In the power transfer phase, the transfer device 1000 may output first power and the reception device 2000 may receive second power, which is some of the first power, according to power efficiency. If the desired power of the reception device 2000 is greater than the second power, the reception device 2000 may transmit the control error packet including the transmit power increasing request signal to the transfer device 1000.

The transfer device 1000, which has received the control error packet, may determine third power satisfying the desired power based on the transmit power increasing request signal.

Thereafter, the transfer device 100 may determine whether the third power is generated and transferred based on the first power, the third power and the receivable power.

As the method of determining whether the third power is generated and transferred, an overshoot peak value in the transient state of the third power may be determined and whether a difference between the overshoot peak value and the receivable power exceeds the power threshold may be determined.

When the power difference exceeds the power threshold, the transfer device 1000 may end power transfer without generating the third power.

The overshoot may be a level of a signal exceeding the level of the third power in the transient state of the power signal before reaching the target third power. A first overshoot may be referred to as a maximum overshoot.

The overshoot peak value may be changed by the level of the power signal of the third power and may be changed according to a power increment from the first power to the third power. The information on new transmit power to be generated, information on currently output transmit power, data for experimentally determining increment of new transmit power from the currently output transmit power and the overshoot peak value are pre-stored. When the transfer device 1000 generates new transmit power, the overshoot peak value may be determined by referring to the stored information.

In the embodiment, if the output power of the transfer device 1000 is controlled based on the power control information fed back from the reception device 2000, the power output from the transfer device 1000 may be instantaneously increased, thereby preventing the system of the reception device 2000 from crashing before receiving the message indicating that overpower is currently received from the reception device 2000.

Meanwhile, the receivable power of the reception device 2000 is determined in consideration of the type of the reception device 2000 or the allowable capacity of the reception-side coil unit 2100 and the reception-side power converter 202, which may be included in the power transfer contract.

(4-1) When the Third Power is Greater than Receivable Power, FIGS. 9 and 10

When the third power to be generated by the transfer device 1000 is greater than the receivable power of the reception device 2000, at least one of 1) whether the difference between the receivable power of the reception device 2000 and the third power exceeds the power threshold as shown in FIG. 9 or 2) whether the difference between the receivable power of the reception device 2000 and the overshoot peak value of the power signal of the third power exceeds the power threshold as shown in FIG. 10 may be determined. When the overshoot peak value is determined, as shown in the figure, power increment may also be considered.

(4-2) When Third Power is Less than Receivable Power, FIG. 10

Whether a difference between the receivable power of the reception device 2000 and the overshoot peak value of the power signal of the third power is equal to or greater than the power threshold, as shown in FIG. 11, may be determined. In this case, power increment may also be considered.

The power difference may be calculated and whether the power difference exceeds the power threshold may be determined, thereby ending power transfer without generating the third power.

Meanwhile, when power transfer ends, the transfer device 100 may enter the ping phase and detect the reception device 2000. When the reception device 2000 is detected, the transfer device may immediately enter the power transfer phase without entering the identification and configuration phase. In this case, power less than the third power, e.g., the first power, may be transferred.

Hereinafter, a method of generating and transferring new power will be described in detail.

<Power Transfer Control Method>

Figure 12:
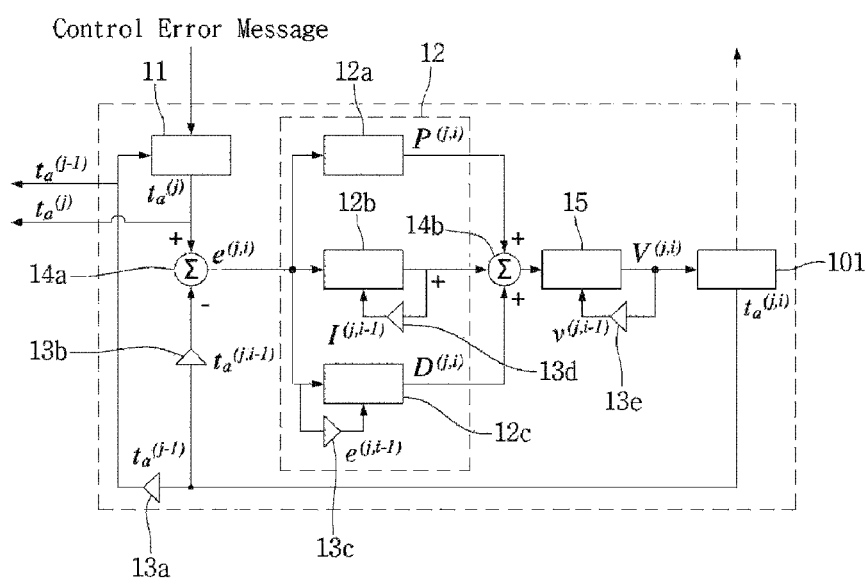
FIG. 12 is a diagram showing a controller of a transfer device for a power transfer control method in detail.
Figure 13:
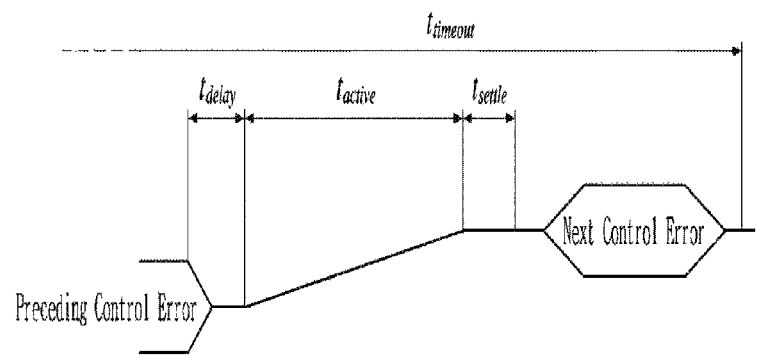
FIG. 13 is a timing chart of a transfer device in a power transfer phase.

FIG. 12 is a diagram showing a controller of a transfer device for a power transfer control method in detail, and FIG. 13 is a timing chart of a transfer device in a power transfer phase.

Referring to FIG. 12, as a power transfer control method, the controller 103 of the transfer device 1000 may control the current of the transfer coil unit 1400 to become new transfer coil current. Such power transfer control may be performed based on a proportional integral differential (PID) algorithm.

In order to perform the PID algorithm, the transfer device 1000 may include a first calculator 11, a second calculator 15, a proportional controller 12a, an integral controller 12b, a derivative controller 12c, first to fifth amplifiers 13a, 13b, 13c, 13d and 13e and first and second summers 14a and 14b and perform the following process to control the power converter 101.

j=1, 2, 3, . . . may indicate the order of control error packets received by the transfer device 1000. Each of the first to fifth amplifiers 13a, 13b, 13c, 13d and 13e may have at least one of an amplifier, a buffer and a delay unit.

(1) New Transfer Coil Current Calculation Step

1) When the first calculator 11 of the transfer device 1000 receives the control error packet, new transfer coil current td(j) may be calculated according to Equation 3.

$$t_d^{(j)} = t_a^{(j-1)} \times \left[1 + \frac{c^{(j)}}{128}\right]$$ Equation 3

2) Here, ta(j−1) may denote actual (current) transfer coil current (actual primary cell current) determined according to a preceding control error packet c(j−1), and c(j) may denote a control error value included in a j(th) control error packet. In addition, ta(0) may mean current of the transfer coil unit 1400 at the start point of the power transfer phase.

A magnetic field may be generated in the transfer coil unit 1400 based on the transfer coil current, thereby generating output power.

3) The first calculator 11 receives the j-th control error packet and the actual transfer coil current ta(j−1) through the first amplifier 13a, performs the calculation process according to Equation 3 above, and calculates and outputs new transfer coil current td(j).

4) If the control error value c(j) is not zero (nonzero), the transfer device 1000 may adjust the transfer coil current during a predetermined time (t_active of FIG. 13). To this end, the transfer device 1000 may execute a loop including the below-described steps.

Here, i=1, 2, 3, . . . max may indicate the number of repetitions of the loop.

(2) Step of Determining Whether Power Transfer Ends

New transmit power may be determined based on the calculated new transfer coil current ta(j). According to the result of comparing the new transmit power, the current transmit power according to the current transfer coil current ta(j−1) and the receivable power of the reception device 2000 with the power threshold, power transfer ends without generating the new transmit power or the new transmit power may be generated and transferred according to the below-described steps.

(3) Error Calculation Step

1) The transfer device 1000 may calculate an error in an i-th loop according to a difference between new transfer coil current td(j) and actual transfer coil current (ta(j, i−1) of an (i−1)-th loop, according to Equation 4.

$$e^{(j,i)} = t_d^{(j)} - t_a^{(j,i-1)}$$ Equation 4 where, ta(j, i−1) may denote transfer coil current determined by the (i−1)-th loop, and ta(j,0) may denote actual transfer coil current at a start point of a loop.

2) The first summer 14a sums the new transfer coil current td(j) and the actual transfer coil current ta(j, i−1) determined by the (i−1)-th loop from the second amplifier 13a to calculate an error, and outputs the calculated error to the PID controller 12.

(4) Control Value Calculation Step

1) The PID controller 12 of the transfer device 1000 may perform proportional control (P) for changing a control value in proportion to the error, integral control (I) for integrating the error to perform control and derivative control (D) for determining a control value through error change.

The PID controller 12 may calculate a proportional term, an integral term and a derivative term as shown in Equation 5. Specifically, the proportional controller 12a may calculate the proportional term P(j, i) based on the error, the integral controller 12b may calculate the integral term I(j, i) based on the accumulated error, and the derivative controller 12c may calculate the derivative term D(j, i) based on error change.

$$P^{(j,i)} = K_p \times e^{(j,i)}$$

$$D^{(j,i)} = K_d \times \frac{e^{(j,i)} - e^{(j,i-1)}}{t_{inner}}$$ Equation 5

2) where, Kp denotes proportional gain, Ki denotes integral gain, and Kd denotes derivative gain. In addition, t_inner denotes a time required to repeat one loop. In addition, the integral term I(j,0)=0, and the error e(j,0)=0. The transfer device 1000 may restrict the integral term I(j,i) within a range of ?M_I . . . +M_I, and the calculated integral term I(j, i) may be changed to an appropriate boundary value as necessary. Here, M_I is an integral term limit parameter.

3) The output signal of the integral controller 12b may be fed back to the input terminal of the integral controller 12b through the fourth amplifier 13d. At this time, the fed-back output signal is the integral term (I(j, i−10 of a preceding ((i−1)-th) loop. In addition, the input signal of the derivative controller 12c may be input to the derivative controller 12c through the third amplifier 13c. At this time, the input signal is the error (e(j, i−1) of the preceding ((i−1)-th) loop.

The second summer 14b of the transfer device 1000 may sum the proportional term (j, i) output from the proportional controller 12a, the integral term I(j, i) output from the integral controller 12b and the derivative term D(j, i) output from the derivative controller 12c to calculate a current (i-th) control value PID (j, i), as shown in Equation 6.

$$PID^{(j,i)} = P^{(j,i)} + I^{(j,i)} + D^{(j,i)}$$ Equation 6

5) The transfer device 1000 may output the current (i-th) control value PID (j, i) according to the above calculation, The current (i-th) control value PID (j, i) may be restricted within a range of ?M_PID . . . +M_PID. Here, M_PID is a control value limit parameter (PID output limit parameter).

(5) Step of Calculating New Controlled Variable

1) The transfer device 1000 may calculate a new controlled variable based on Equation 7.

$$v^{(j,i)} + v^{(j,i-1)} - S_v \times PID^{(j,i)}$$ Equation 7

2) where, Sv may denote a scaling factor based on the controlled variable. In addition, the controlled variable is v(i, 0)=v(j−1, i_max), and v(0,0) may denote the actual value of the controlled variable at a start time of the power transfer phase. The controlled variable may be any one of an operating frequency, the duty cycle of the DC/AC converter 1200 or the input voltage of the DC/AC converter 1200. If the calculated v(j, i) exceeds a predetermined range, the transfer device 1000 may change the calculated v(j, i) to an appropriate limit value.

3) The second calculator 15 may calculate a new controlled variable v(j, i) according to Equation 7 above based on the input current (i-th) control value PID (j, i) and the controlled variable of a preceding ((i−1)-th) loop fed back through the fifth amplifier 13e.

(6) Step of Controlling Power Converter Based on New Controlled Variable

1) The transfer device 1000 may apply a controlled variable v(j, i) of a new value to the DC/AC converter 1200. In addition, the controlled variable may be the output voltage of the AC/DC converter 1100. In this case, the transfer device 1000 may apply the controlled variable v(j, i) of the new value to the output voltage of the AC/DC converter 1100, thereby adjusting the input voltage of the DC/AC converter 1200.

2) The transfer device 1000 may generate new power according to the transfer coil current ta(j, i) determined by the first calculator 11 based on the controlled variable v(j, i) of the new value.

(7) Meanwhile, referring to FIG. 10, the transfer device 1000 may determine the transfer coil current ta(j) during a time t_delay+t_active+t_settle after the reception end point of the j(th) control error packet.

Here, t_delay may mean a time delayed to perform power control according to the preceding control error packet after receiving the preceding control error packet, t_active may mean a time required to perform power control (in the example of the figure, to increase transmit power) according to the preceding control error packet, and t_settle may mean a settlement time of a target power value.

Meanwhile, the predetermined range used to determine whether the gains Ki, Ki and Kd of the PID controller 12, the integral term limit parameter M_I, the PID output limit parameter M_PID and V(j, i) exceed the predetermined range and the scaling factor Sv may be determined in consideration of the transmit power properties of the power transfer contract, the specifications of the transfer device 1000 and the standard and capacity of the transfer coil unit 1400.

In addition, the power transfer contract may include information on the power threshold.

The transfer device 1000 for receiving the control error packet may determine new transfer coil current and determine new transmit power based on the new transfer coil current. According to the amount of new transmission power, wireless power transfer may end without generating the new transmit power or the new transmit power may be generated to continue to transfer wireless power.

According to the embodiment, if the coupling coefficient is low due to misalignment, between the transfer device 1000 and the reception device 2000, receive power of the reception device 2000 is less than power output from the transfer device 1000. Therefore, the reception device 2000 may require more power and the amount of transmit power of the transfer device 1000 may increase. At this time, before generating increased transmit power, transmit power is compared with the power threshold to predetermine whether power is appropriately transferred and whether power is generated and transferred is determined depending on whether power is appropriately transferred, thereby solving a problem that the reception device 2000 is damaged by excessive transmit power and heating according to excessive transmit power.

In particular, as in the vehicle wireless charging system, if misalignment between the transfer device 1000 and the reception device 2000 instantaneously and repeatedly occurs due to rocking of the vehicle, the transmit power of the transfer device 1000 may be instantaneously and rapidly changed but generation of transmit power may be determined in consideration of stability of the reception device 2000, thereby preventing the reception device 2000 from being damaged.

Although embodiments have been described with reference to a number of illustrative embodiments thereof, it should be understood that numerous other modifications and embodiments can be devised by those skilled in the art that will fall within the spirit and scope of the principles of this disclosure. Accordingly, the scope of the embodiments should be determined by the appended claims and their legal equivalents, not by the above description.

INDUSTRIAL APPLICABILITY

Embodiments relate to wireless power transfer technology and are applicable to a wireless power transfer system for controlling the amount of power between wireless power transmission and reception devices.

The invention claimed is:

1. A method of wirelessly transferring power from a transmitter to a receiver, the method comprising:
    transferring a signal for detecting the receiver;
    receiving an identification signal from the receiver;
    transferring first power to the receiver;
    receiving a power increasing request signal from the receiver;
    determining second transfer coil current based on first transfer coil current of the transmitter and the power increasing request signal;
    determining second power based on the second transfer coil current; and
    comparing the second power, receivable power of the receiver and a power threshold with each other to determine whether the second power is transferred.

2. The method according to claim 1, wherein the determining of whether the second power is transferred includes determining whether the second power is transferred according to a difference between the receivable power and the second power.

3. The method according to claim 2, wherein, if the difference exceeds the power threshold, wireless power transfer ends.

4. The method according to claim 3, further comprising transferring a signal for detecting the receiver when wireless power transfer ends.

5. The method according to claim 4, further comprising transferring predetermined wireless power when the receiver is detected.

6. The method according to claim 2, further comprising controlling a power converter based on proportional integral differential (PID) control, when the difference is equal to or less than the power threshold.

7. The method according to claim 6, wherein the controlling of the power converter based on the PID control includes:
    determining a control value based on the PID control;
    determining a current controlled variable based on the control value and a preceding controlled variable; and controlling the power converter based on the current controlled variable to transfer the second power.

8. The method according to claim 7, wherein at least one of an input voltage, a drive frequency and a duty cycle of the power converter is adjusted based on the controlled variable.

9. The method according to claim 1, wherein the determining of whether the second power is transferred includes determining whether the second power is transferred according to a difference between the receivable power and an overshoot peak value of the second power.

10. The method according to claim 9, wherein the overshoot peak value is determined based on at least one of the second power and an increment from the first power to the second power.

11. A method of, at a receiver, wirelessly receiving power from a transmitter, the method comprising:
   transferring a response signal to a first ping signal from the transmitter;
   transferring identification information to the transmitter;
   receiving first power from the transmitter;
   transferring a power increasing request signal to the transmitter;
   determining whether power is received from the transmitter; and
   transferring a response signal to a second ping signal from the transmitter when wireless power reception ends.

12. The method according to claim 11, further comprising receiving predetermined power from the transmitter, which has received the response signal.

13. The method according to claim 11, wherein the identification signal includes a receivable power of the receiver.

14. The method according to claim 11, further comprising:
   comparing second power with desired power upon receiving the second power corresponding to the power increasing request signal; and
   transferring a control error value to the transmitter according to a result of comparison,
   wherein the control error value is any one of a positive value, zero and a negative value,
   wherein the power increasing request signal corresponds to a control error value of a positive value,
   wherein a power maintenance request signal corresponds to a control error value of zero, and
   wherein a power decreasing request signal corresponds to a control error value of a negative value.

15. A transmitter comprising:
   a transfer coil configured to wirelessly transfer power;
   a power converter configured to output power to the transfer coil; and
   a controller configured to control the power converter in order to control the amount of power output to the transfer coil;
   wherein the controller determines new power based on a power increasing request signal from a receiver and determines whether the new power is generated based on the new power, receivable power from the receiver and a power threshold.

16. The transmitter according to claim 15, wherein whether the new power is generated is determined according to a difference between the receivable power and the new power.

17. The transmitter according to claim 16, wherein generation of the new power ends when the difference exceeds the power threshold.

18. The transmitter according to claim 15, wherein whether the new power is generated is determined according to a difference between the receivable power and an overshoot peak value of the new power.

19. The transmitter according to claim 18, wherein the overshoot peak value is set based on at least one of the new power and an increment from current output power of the power converter to the new power.

20. The transmitter according to claim 15, wherein the controller adjusts any one of a drive frequency, an input voltage or a duty cycle of the power converter to control an amount of power.

21. The transmitter according to claim 15,
   wherein the controller includes:
   a first calculator configured to determine second current based on the power increasing request signal from the receiver and first current of the transfer coil;
   a proportional integral differential (PID) controller configured to determine a control value based on PID control; and
   a second calculator configured to determine a current controlled variable based on the control value and a preceding controlled variable, and
   wherein the power converter is controlled based on the current controlled variable.

22. A receiver comprising:
   a reception coil configured to receive first power from a transmitter; and
   a controller configured to communicate with the transmitter,
   wherein the controller:
   transfers a power increasing request signal based on a difference between first power and desired power, and
   receives second power or a receiver ping signal based on the power increasing request signal.

23. The receiver according to claim 22, wherein the controller determines the difference between the second power and the desired power when the reception coil receives the second power.

24. The receiver according to claim 22, wherein the controller transfers a response signal to the ping signal.

25. The receiver according to claim 24, wherein predetermined power is received from the transmitter, which has received the response signal.

* * * * *